US011182811B2

(12) United States Patent
Omer et al.

(10) Patent No.: US 11,182,811 B2
(45) Date of Patent: Nov. 23, 2021

(54) SYSTEM AND METHOD USING A DYNAMIC PRICING ENGINE TO DETERMINE PRICING FOR GOODS

(71) Applicant: WasteLess LTD, Kfar Saba (IL)

(72) Inventors: Oded Omer, Holon (IL); Yossi Regev, Ramat Gan (IL)

(73) Assignee: WASTELESS LTD, Kfar Saba (IL)

( * ) Notice: Subject to any disclaimer, the term of this patent is extended or adjusted under 35 U.S.C. 154(b) by 0 days.

(21) Appl. No.: 16/835,893

(22) Filed: Mar. 31, 2020

(65) Prior Publication Data

US 2020/0242644 A1 Jul. 30, 2020

Related U.S. Application Data

(63) Continuation-in-part of application No. 15/677,262, filed on Aug. 15, 2017, now Pat. No. 10,846,721.

(51) Int. Cl.
*G06Q 30/02* (2012.01)
*G06Q 30/00* (2012.01)
(Continued)

(52) U.S. Cl.
CPC ......... *G06Q 30/0206* (2013.01); *G06N 3/126* (2013.01); *G06N 7/00* (2013.01);
(Continued)

(58) Field of Classification Search
CPC ........... G06Q 30/0206; G06K 7/10237; G06K 7/1413; G06K 7/1417
(Continued)

(56) References Cited

U.S. PATENT DOCUMENTS 5,483,624 A 1/1996 Christopher et al.
6,007,759 A 12/1999 Ten Tije et al.
(Continued)

FOREIGN PATENT DOCUMENTS

JP 2017502856 A 1/2017
KR 20090090567 A * 8/2009
WO 2019035002 A1 2/2019

OTHER PUBLICATIONS

Jawad Khan, What Is Dynamic Pricing & How Does It Affect Ecommerce?, 2015 (Year: 2015).*
(Continued)

*Primary Examiner* — Tarek Elchanti
(74) *Attorney, Agent, or Firm* — David Postolski, Esq.; Gearhart Law LLC

(57) ABSTRACT

Methods, systems, and computing devices for determining a price of a good during a time period are described. The method includes scanning, via a scanner coupled to a computing device or a server, a readable identification tag affixed to the good and querying the computing device or the server to identify, from the readable identification tag, the good and information associated with the good. The information comprises one or more price-calculation factors assigned to the good. The method further includes applying an algorithm of a dynamic pricing engine to the identified good to: calculate a price of the good and modify the calculated price of the good to optimize a target function. The optimization depends on the one or more price-calculation factors. The method further includes transmitting the optimized price of the good to a display for display to a customer.

15 Claims, 4 Drawing Sheets

(51) Int. Cl.
*G06Q 10/04* (2012.01)
*G06Q 10/08* (2012.01)
*G06Q 20/20* (2012.01)
*G06N 3/12* (2006.01)
*G06N 7/00* (2006.01)
*G06K 7/14* (2006.01)
*G06K 7/10* (2006.01)

(52) U.S. Cl.
CPC ........... *G06Q 10/04* (2013.01); *G06Q 10/087* (2013.01); *G06Q 20/201* (2013.01); *G06Q 20/208* (2013.01); *G06Q 30/0185* (2013.01); *G06Q 30/0281* (2013.01); *G06K 7/10297* (2013.01); *G06K 7/1413* (2013.01); *G06K 7/1417* (2013.01)

(58) Field of Classification Search
USPC .............................................. 705/14.38, 7.35
See application file for complete search history.

(56) References Cited

U.S. PATENT DOCUMENTS

| | | | |
|---|---|---|---|
| 6,379,058 | B1 | 4/2002 | Petteruti et al. |
| 6,409,401 | B1 | 6/2002 | Petteruti et al. |
| 7,054,832 | B1 | 5/2006 | Vallabh |
| 7,180,627 | B2 | 2/2007 | Moylan et al. |
| 2004/0210495 | A1 | 10/2004 | White |
| 2006/0221363 | A1 | 10/2006 | Roth et al. |
| 2006/0277109 | A1 | 12/2006 | Kerth et al. |
| 2007/0023516 | A1 | 2/2007 | Chapman et al. |
| 2012/0022947 | A1 | 1/2012 | Esprey |
| 2012/0095823 | A1* | 4/2012 | Tak ..................... G06Q 10/087 705/14.38 |
| 2013/0138491 | A1 | 5/2013 | Gao et al. |
| 2015/0174803 | A1 | 6/2015 | Newman et al. |
| 2015/0317667 | A1 | 11/2015 | Wohlert et al. |
| 2019/0057409 | A1 | 2/2019 | Omer et al. |

OTHER PUBLICATIONS

International Search Report, dated Dec. 2, 2018, for PCT/IB2018/056124, International Filing date of Aug. 15, 2018, consisting of 4 Pages.
Written Opinion of the International Searching Authority, dated Nov. 29, 2018, for PCT/IB2018/056124, International Filing date of Aug. 15, 2018, consisting of 4 Pages.
Auren Manning, "Wasteless Raises $400k Seed for 'Internet of Groceries' Technology," AgFunderNews, Apr. 20, 2017, accessible at: https://agfundernews.com/breaking-exclusive-wasteless-raises-400k-seed-internet-groceries-technology.html.
Kristin Musulin, "Startup Introduces 'Internet of Groceries' to Push Sales While Reducing Waste," SmartCitiesDive, May 7, 2017, accessible at: https://www.smartcitiesdive.com/news/startup-introduces-internet-of-groceries-to-push-sales-while-reducing-was/441882/.
"Wasteless Demo Day Pitch," Wasteless, Aug. 4, 2017, accessible at: https://www.youtube.com/watch?v=72upLDfueUA.

* cited by examiner

SYSTEM AND METHOD USING A DYNAMIC PRICING ENGINE TO DETERMINE PRICING FOR GOODS

CROSS-REFERENCE TO RELATED APPLICATIONS

This application is a U.S. Continuation-in-Part patent application that claims priority to U.S. Non-Provisional patent application Ser. No. 15/677,262 filed on Aug. 15, 2017, the entire contents of which are hereby incorporated by reference.

FIELD OF THE EMBODIMENTS

The field of the invention and its embodiments relate to a method executed by a system for determining a price of a good during a time period. In particular, the present invention and its embodiments provide a method executed by a system for determining a price of a good during a time period based on application of an algorithm associated with a dynamic pricing engine that calculates a price of the good and modifies the calculated price of the good to optimize a target function, where the optimization depends on one or more price-calculation factors.

BACKGROUND OF THE EMBODIMENTS

Food spoilage is a major problem in the grocery industry. Billions of dollars of merchandise is lost every year to do expired food not being sold. Given the choice to pay the same price for goods having longer shelf lives and goods about to expire, consumers are less likely to purchase the goods about to expire. This results in many items not getting sold, leading to many items being thrown away. Therefore, a method of dynamic pricing for grocery items is needed to help increase sales and reduce waste.

REVIEW OF RELATED TECHNOLOGY

U.S. Pat. No. 5,483,624 generally describes a hand held labeler is programmable to operate in accordance with a sequence of commands forming an application program that is downloaded to the labeler and stored in a random access memory. Each command is associated with a command routine selected from a set of command routines that is stored in a read only memory. The commands of the application program and associated command routines are executed by a microprocessor of the labeler to perform flexible data collection, data manipulation and label printing operations.

U.S. Patent Publication No. 2007/0075832 generally describes a user-programmable (UP) component for an RFID reader. The UP component facilitates reading an RFID tag and interfacing to I/O that functions as a validation mechanism that the read operation has occurred. The UP component facilitates application of the reader to new and/or different systems and products. The UP component can be a separate external device or module that interfaces to the RFID reader, or can be integrated into the reader for operation therein.

U.S. Patent Publication No. 2007/0023516 generally describes an RFID tag is pre-programmed with information about an object or device used in an RFID printer system. The RFID printer system can then read this information and take the appropriate action, such as user notification or printer parameter adjustment, to improve printer performance. The RFID tag can contain information about and be attached to printer elements, such as an RFID label or roll of labels, a print head, or a printer ribbon.

Various methods exist for calculating a price of a good. However, their means of operation are substantially different from the present disclosure, as the other inventions fail to solve all the problems taught by the present disclosure.

SUMMARY OF THE EMBODIMENTS

The present invention and its embodiments relate to a method executed by a system for determining a price of a good during a time period. In particular, the present invention and its embodiments provide a method executed by a system for determining a price of a good during a time period based on application of an algorithm associated with a dynamic pricing engine that calculates a price of the good and modifies the calculated price of the good to optimize a target function, where the optimization depends on one or more price-calculation factors.

A first embodiment of the instant invention provides a system for determining a first price of a good during a first time period. The system includes: a good, a readable identification tag affixed to the good, a computing device, and a scanner coupled to the computing device. The readable identification tag includes: a Radio-Frequency Identification (RFID) tag, a barcode, and/or a matrix barcode. The computing device includes: a dynamic pricing engine, a processor, and a memory. The memory is configured to store information associated with the good. The information comprises one or more price-calculation factors assigned to the good.

In examples, each factor of the one or more price-calculation factors may include: an expiration date of the good, a quantity of similar goods, a sale strength of a brand of goods, a catalog price listed for the good, a predetermined minimum price allowed for the good, a demographic area in which the good is sold, a day of the week in which the good is sold, an hour of the day in which the good is sold, a demand curve for the good, whether the good is discounted, whether the good is packaged, whether the good has any competitors, the last price that was charged for the good, whether there is an active advertising campaign for the good, and/or a price history of the good, among others not explicitly listed herein.

The scanner is configured to scan the readable identification tag affixed to the good and query, dynamically and in real-time, the memory of the computing device to identify, from the readable identification tag, the good and the information associated with the good. The scanner is also configured to apply an algorithm of a dynamic pricing engine to the identified good to calculate a first price of the good and modify the first price of the good during the first time period to optimize a target function. The optimization depends on the one or more price-calculation factors. In examples, the scanner is further configured to transmit the first price of the good to a customer. In some examples, the scanner is further configured to transmit the first price of the good to a display for display to the customer.

In additional examples and during a second time period, the scanner is configured to apply the algorithm to the identified good to calculate a second price of the good during the second time period and modify the second price of the good during the second time period to optimize the target function. The optimization depends on the one or more price-calculation factors. In examples, the first price of the good is greater than the second price of the good. Moreover, the second time period is closer to an expiration date of the good than the first time period.

A second embodiment of the instant invention describes a method executed by a system for determining a price of a good during a time period. The system includes: a good, a readable identification tag affixed to the good, a computing device comprising a dynamic pricing engine, a processor, and a memory, a scanner coupled to the computing device, and a display coupled to the computing device.

The method includes scanning, via the scanner, the readable identification tag affixed to the good and querying the memory of the computing device to identify, from the readable identification tag, the good and information associated with the good. The information includes one or more price-calculation factors assigned to the good. The method further includes applying an algorithm of the dynamic pricing engine to the identified good to calculate the price of the good and modify the calculated price of the good to optimize a target function. The optimization depends on the one or more price-calculation factors.

Further, the target function may be based on factors that include: waste associated with the good during the time period, revenue associated with the good during the time period, waste associated with the good and other goods during the time period, revenue associated with the good and other goods during the time period, and/or marginal profits associated with the good during the time period. In other examples, the target function may depend on an amount of the good consumed during the time period. Additionally, the method includes transmitting the optimized price of the good to the display for display to a customer.

In examples, the algorithm is a reinforcement learning algorithm, a deep learning algorithm, a machine learning algorithm, or a classic optimization algorithm, among other examples not explicitly listed herein. In additional examples, the reinforcement learning algorithm depends on a simulated environment. Moreover, the reinforcement learning algorithm may be a Q-learning algorithm or a genetic algorithm.

A third embodiment of the invention describes a computing device. The computing device includes one or more processors, one or more memories, and one or more computer-readable hardware storage devices. The one or more computer-readable hardware storage devices contain program code executable by the one or more processors via the one or more memories to implement a method for determining a price of a good during a first time period. The method includes receiving, by the one or more memories and from a scanner coupled to the computing device, a prompt for information associated with a readable identification tag affixed to the good and querying the one or more memories to identify the good and the information associated with the good from the readable identification tag. The information associated with the good comprises one or more price-calculation factors assigned to the good.

The method further includes applying an algorithm to the identified good to: calculate a first price of the good during the first time period, modify the first price of the good to optimize a target function, calculate a second price of the good during a second time period, and modify the second price of the good to optimize the target function. The algorithm may include: a reinforcement learning algorithm, a deep learning algorithm, a machine learning algorithm, or a classic optimization algorithm, among other algorithms not explicitly listed herein.

In examples, the first price of the good is greater than the second price of the good. Moreover, the second time period is closer to an expiration date of the good than the first time period. The method further includes transmitting the optimized first price of the good and the optimized second price of the good to a display for display to a customer.

In general, the present invention succeeds in conferring the following benefits and objectives.

It is an object of the present invention to provide a method of dynamic pricing for grocery items to help increase revenue.

It is an object of the present invention to provide a method of dynamic pricing for grocery items to reduce food waste.

It is an object of the present invention to provide a dynamic pricing engine that increases revenue and reduces food waste for grocery items.

It is an object of the present invention to provide a dynamic pricing engine that utilizes machine learning to increase revenue and reduces food waste for grocery items.

It is an object of the present invention to provide a dynamic pricing engine that employs one or more branches of machine learning to modify a price of a good according to observed current shopping patterns and previous historical shopping patterns of the good to reduce food waste and optimize revenue for a store.

DESCRIPTION OF THE PREFERRED EMBODIMENTS

Figure 1:
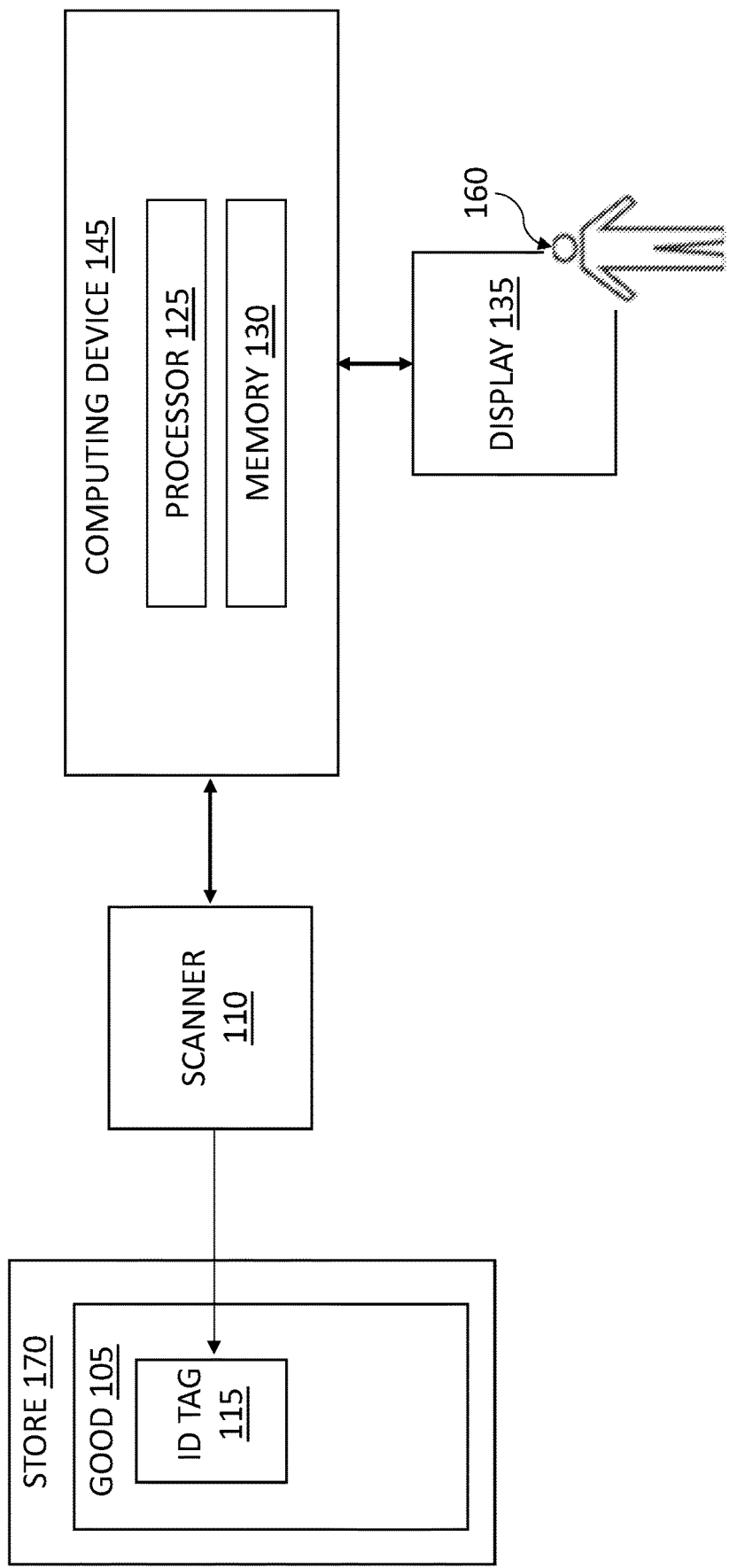
FIG. 1 depicts a perspective view of a system for determining a price of a good during a time period, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
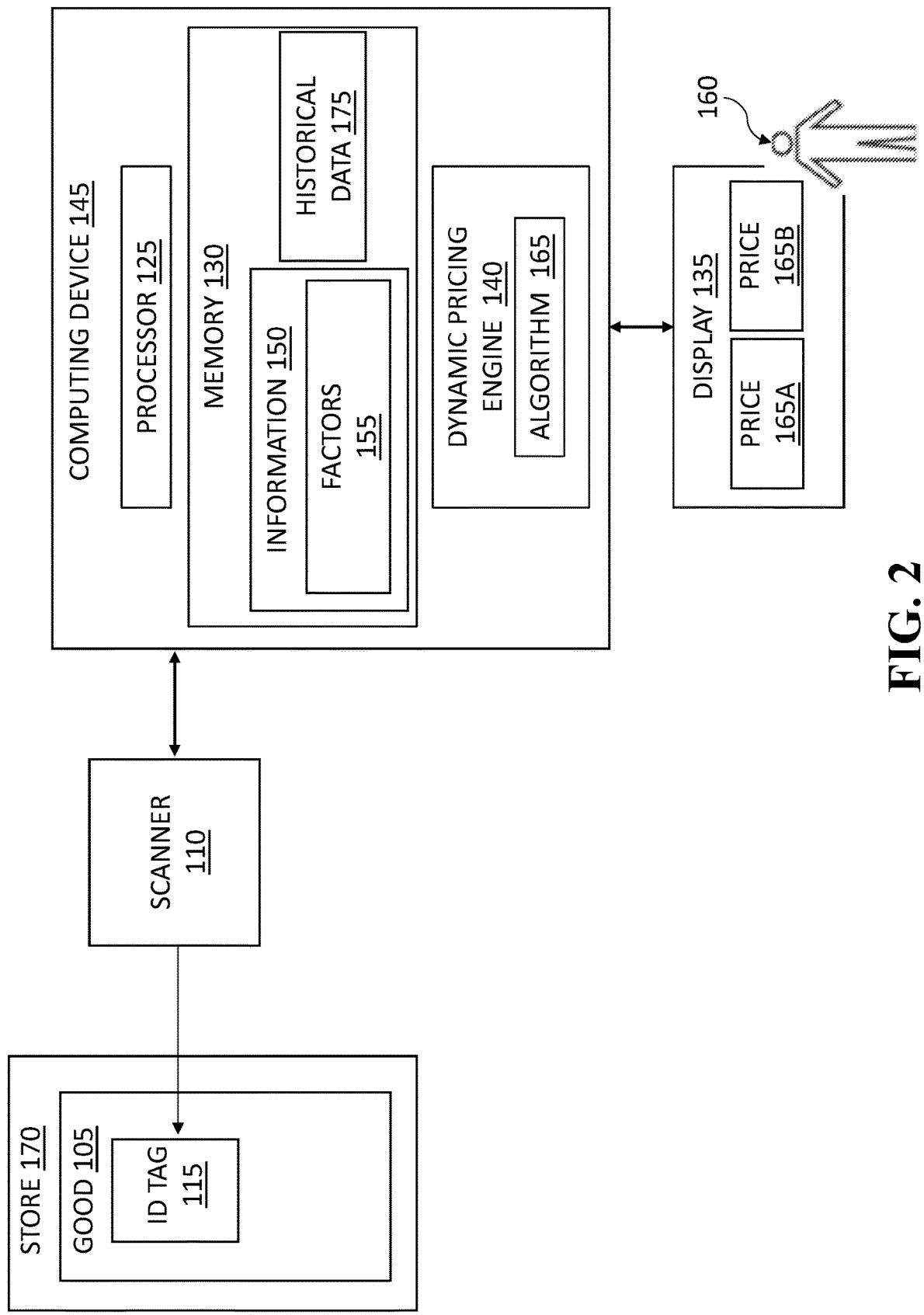
FIG. 2 depicts another perspective view of a system for determining a price of a good during a time period, in accordance with embodiments of the present invention.

FIG. 1 and FIG. 2 depict a perspective view of a system for determining a price of a good during a time period, in accordance with embodiments of the present invention.

The system of FIG. 1 and FIG. 2 includes a good 105 stored in a store 170 (such as a grocery store), a readable identification tag 115 affixed to the good 105, a computing device 145, a scanner 110 coupled to the computing device 145, and a display 135 coupled to the computing device 145. The scanner 110 and the display 135 may be coupled to the computing device 145 through a wired and/or wireless connection, such as, e.g., local WiFi, the cloud. The readable identification tag 115 may be a Radio-Frequency Identification (RFID) tag, a barcode, and/or a matrix barcode.

The computing device 145 may be a computer, a laptop computer, a smartphone, and/or a tablet, among other examples not explicitly listed herein. In examples, the computing device 145 may include a processor 125, a memory 130, and a dynamic pricing engine 140. The memory 130 may store information 150 associated with the good 105, as well as historical data 175. In some examples, the information 150 may include one or more price-calculation factors 155 assigned to the good 105, a name of the good 105, a location of the good 105, and/or any other relevant information. It should be appreciated that the one or more price-calculation factors 155 may be updated dynamically and in real-time. The historical data 175 may include historical information associated with the good 105, historical information associated with other goods in the store 170, and/or other parameters associated with the store 170.

In some examples, the computing device 145 may be a server such that the server comprises the processor 125, the memory 130, and the dynamic pricing engine 140. In this example, the scanner 110 and the display 135 may be coupled to the server through a wired and/or wireless connection, such as, e.g., local WiFi, the cloud.

The one or more price-calculation factors 155 assigned to the good 105 may be used to determine a first price 165A of the good 105 at a first time of sale or a second price 165B of the good 105 at a second time of sale. In examples, each factor of the one or more price-calculation factors 155 may include: the expiration date of the good 105, the quantity of a particular good 105 in the store 170, a quantity of similar items from the same or a different seller, a seller's inventory, a sale strength of a brand associated with the good 105, a catalog price listed for the good 105, a predetermined minimum price allowed for the good 105, a demographic area in which the good 105 is sold, a day of the week in which the good 105 is sold, any particularly significant days of sale for the good 105 (such as, e.g., holidays, days in which major events are taking place, etc.), an hour of the day in which the good 105 is sold, a stock protection of the good 105, a demand curve for the good 105, sale elasticity factors for the good 105, whether certain goods are otherwise already discounted, whether the good 105 is packaged (and/or what type of packaging), the packaged quantity of the good 105, whether the good 105 has any competitors, the last price that was charged for the good 105, any rounding rules applicable for the good 105, whether there is an active advertising campaign for the good 105, the shelf state for the good 105, the price history of the good 105, and/or any other relevant price-calculation factors. According to an embodiment, any or all of the price-calculation factors 155 may be used for good 105. It should be appreciated that the one or more price-calculation factors 155 are continuously analyzed and/or assigned for one or more goods.

In examples, the scanner 110 is configured to scan the readable identification tag 115 affixed to the good 105 and query, dynamically and in real-time, the memory 130 of the computing device 145 to identify, from the readable identification tag 115, the good 105 and the information 150 associated with the good 105. The scanner 110 is also configured to apply an algorithm 165 of the dynamic pricing engine 140 to the identified good 105. The algorithm 165 may employ one or more branches of machine learning to modify a price of the good 105 according to observed current shopping patterns and previous historical shopping patterns of the good 105 to reduce food waste and optimize revenue for the store 170.

The algorithm 165 is applied to the identified good 105 to calculate a first price 165A of the good 105 during the first time period and modify the first price 165A of the good 105 during the first time period to optimize a target function. The optimization depends on external parameters, such as the one or more price-calculation factors 155. Moreover, the algorithm 165 modifies the first price 165A of the good 105 based on the historical data 175, which may include observed current shopping patterns at the store 170, as well as previous historical shopping patterns for the good 105 at the store 170.

It should be appreciated that different optional target functions may be used. In an example, the target function during the first time period may be based on factors that include: waste associated with the good 105 during the first time period, revenue associated with the good 105 during the first time period, waste associated with the good 105 and other goods during the first time period, revenue associated with the good 105 and other goods during the first time period, and/or marginal profits associated with the good 105 during the first time period. In other examples, the target function during the first time period may additionally or alternatively be a function that depends on an amount of the good 105 consumed during the first time period.

In examples, the scanner 110 is further configured to transmit the optimized first price 165A of the good 105 to a customer 160. In some examples, the scanner 110 is further configured to transmit the optimized first price 165A of the good 105 to a display 135 for display to the customer 160. In examples, the display 135 is an electronic shelf label.

In additional examples, the scanner 110 is configured to apply the algorithm 165 to the identified good 105 to calculate a second price 165B of the good 105 during a second time period. The first time period differs from the second time period. In examples, the first time period occurs before the second time period. In other examples, the first time period occurs after the second time period.

The scanner 110 is additionally configured to modify the second price 165B of the good 105 during the second time period to the optimize the target function. The optimization depends on the one or more price-calculation factors 155. In other examples, the target function during the second time period may be based on factors that include: waste associated with the good 105 during the second time period, revenue associated with the good 105 during the second time period, waste associated with the good 105 and other goods during the second time period, revenue associated with the good 105 and other goods during the second time period, and/or marginal profits associated with the good 105 during the second time period. In other examples, the target function during the second time period may additionally or alternatively be a function that depends on an amount of the good 105 consumed during the second time period.

In examples, the optimized first price 165A of the good 105 is greater than the optimized second price 165B of the good. Moreover, the second time period is closer to an expiration date of the good than the first time period. Thus, the closer the sale date of the good 105 is to the expiration date of the good 105, the lower the optimized price will be for the good 105.

In examples, the algorithm 165 may include a reinforcement learning algorithm, a deep learning algorithm, a machine learning algorithm, or a classic optimization algorithm, among other algorithms not explicitly listed herein. It should be appreciated that the algorithm 165 may be one that is not listed explicitly herein.

In a first example, the algorithm 165 may be the reinforcement learning algorithm. The reinforcement learning algorithm depends on a simulated environment, such as an economical model of the store 170 selling the good 105. Parameters associated with the simulated environment may be deduced from the historical data 175 of the store 170 selling the good 105 and may include pricing and demand amounts for the good 105, as well as other store parameters and data. Moreover, in some examples, the reinforcement learning algorithm may be a Q-learning algorithm. In other examples, the reinforcement learning algorithm may be a genetic algorithm. However, it should be appreciated that the reinforcement learning algorithm is not limited to the algorithms explicitly listed herein and other algorithms are contemplated.

In a second example, the algorithm 165 may be the deep learning algorithm or the machine learning algorithm. In this scenario, an output for the target function is a continuous demand forecast (e.g., regression) or is discrete (e.g., classification or regression). For a given point, the system is trained by having the historical data 175 split to demand amounts and prices related to those demand amounts, along with other parameters obtained, such as pricing history and stock levels. Then, the system may be trained with a deep learning structure, such as neural networks, a convolutional neural network developed for biomedical image segmentation (e.g., U-Net), embeddings, and/or auto-ML.

In a third example, the algorithm 165 may utilize the classic optimization algorithm. Use of this algorithm may include selecting a set of prices over time (e.g., from the historical data 174), which optimize the target function according to the observed historical demands for those prices.

Figure 3:
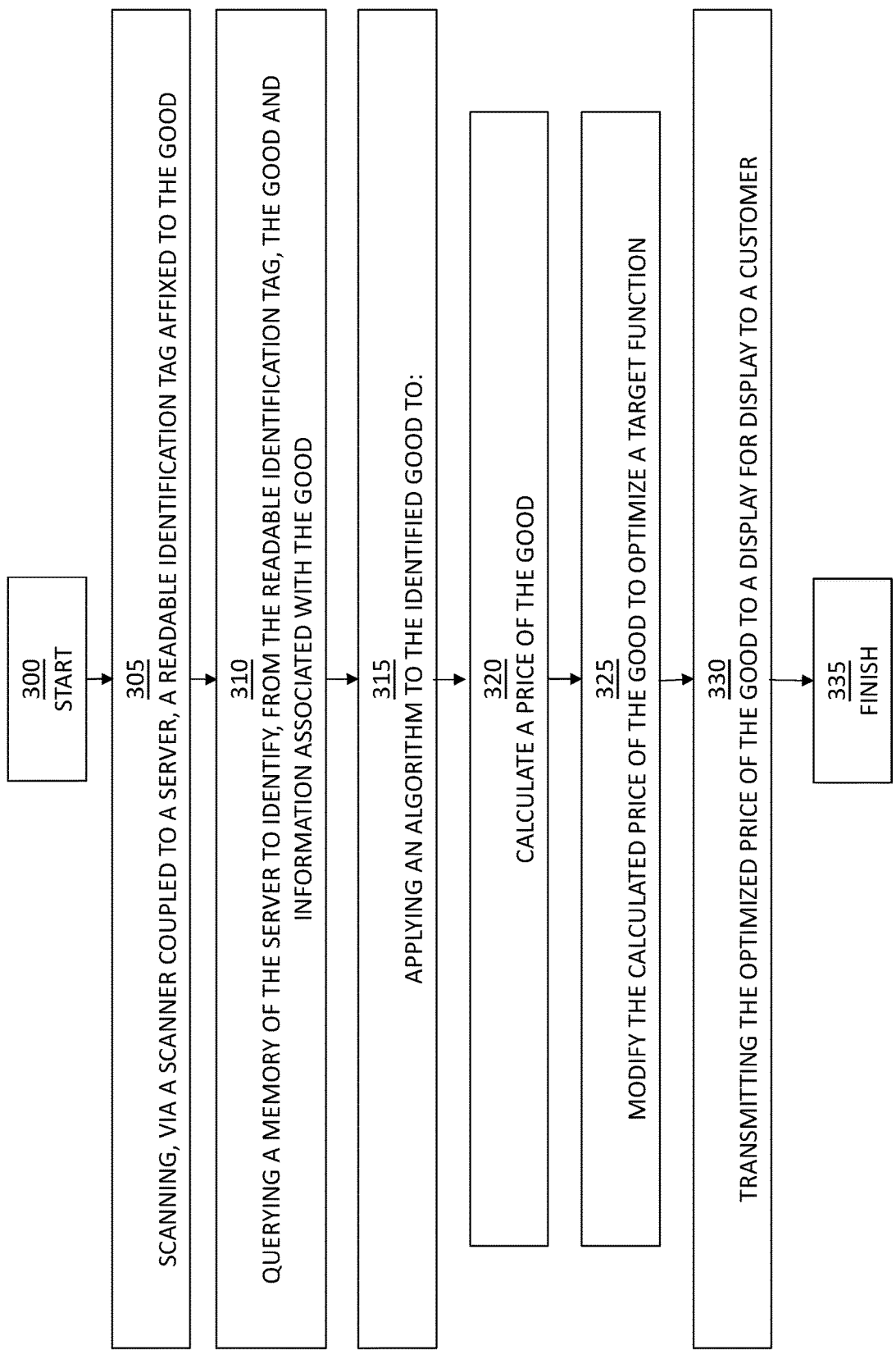
FIG. 3 depicts a block diagram of a method executed by a system of FIG. 1 or FIG. 2 for determining a price of a good during a time period, in accordance with embodiments of the present invention.

FIG. 3 depicts a block diagram of a method executed by a system of FIG. 1 or FIG. 2 for determining a price of a good during a time period, in accordance with embodiments of the present invention.

As depicted in FIG. 3, the method executed by the system of FIG. 1 or FIG. 2 for determining the price of the good 105 during the first or the second time period begins at a process step 300. The process step 300 is followed by a process step 305, which includes scanning, via the scanner 110 coupled to the server (not shown) or the computing device 145, the readable identification tag 115 affixed to the good 105. The process step 305 is followed by a process step 310 that includes querying the memory 130 of the server (not shown) or the computing device 145 to identify, from the readable identification tag 115, the good 105 and information 150 associated with the good 105. The information 150 comprises the one or more price-calculation factors 155 assigned to the good 105, among other data. The good 105 may be assigned the one or more price-calculation factors 155 when the good 105 is inventoried.

The process step 310 is followed by a process step 315 that includes applying the algorithm 165 of the dynamic pricing engine 140 to the identified good 105 to perform a process step 320 and a process step 325. The process step 320 includes calculating a first price 165A of the good 105 during the first time period and calculating a second price 165B of the good 105 during the second time period. The process step 325 includes modifying the first price 165A of the good 105 to optimize the target function and modifying the second price 165B of the good 105 to optimize the target function. The optimization depends on the one or more price-calculation factors 155, described infra.

The process step 325 is followed by a process step 330 that includes transmitting the optimized first price 165A or the optimized second price 165B of the good 105 to the display 135 for display to the customer 160. The process step 330 is followed by a process step 335 that ends the method of FIG. 3.

Figure 4:
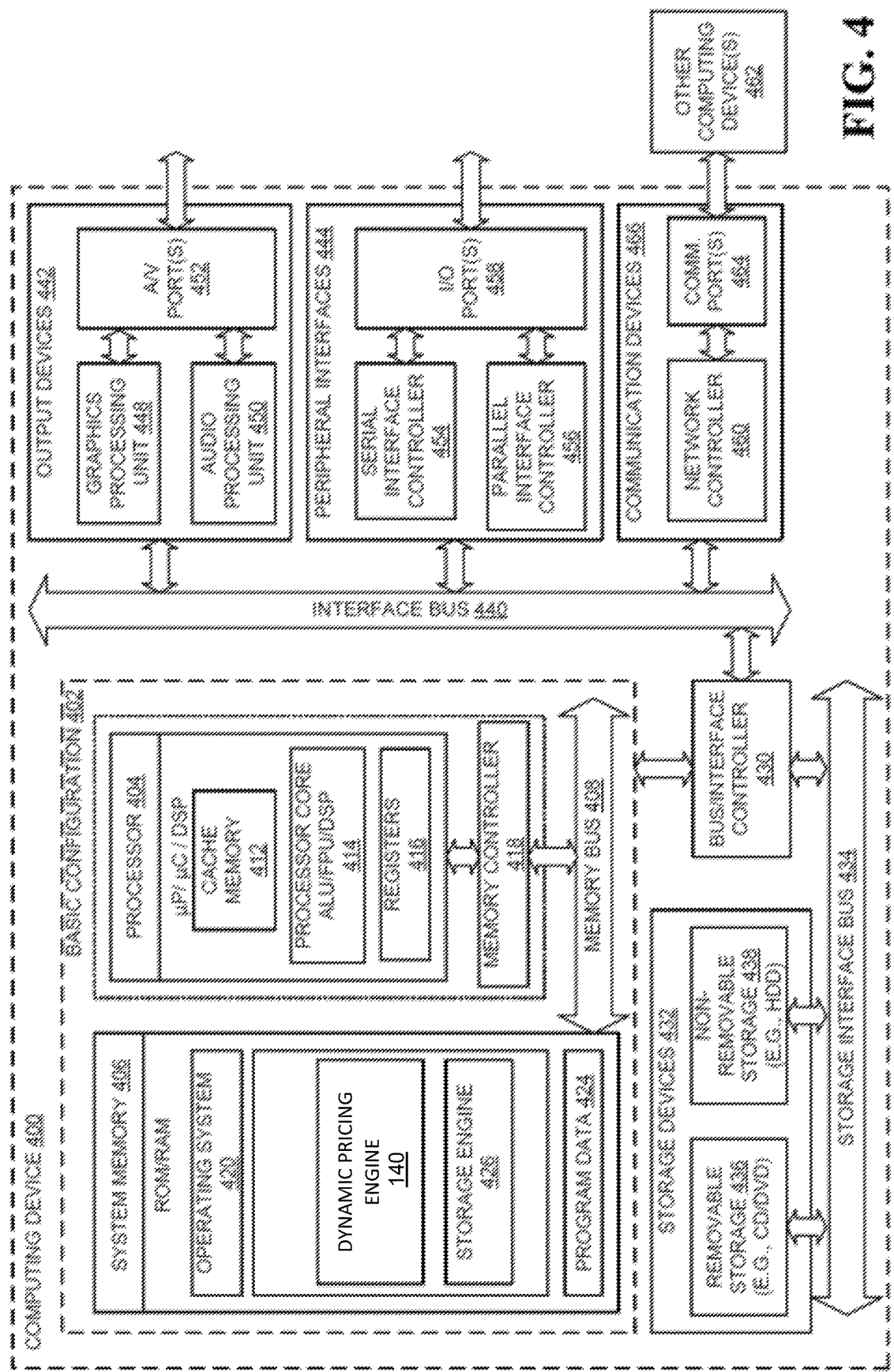
FIG. 4 is a block diagram of a computing device included within the system of FIG. 1 or FIG. 2 that is configured to determine a price of a good during a time period, in accordance with embodiments of the present invention.

FIG. 4 is a block diagram of a computing device included within the system of FIG. 1 or FIG. 2 that is configured to determine a price of a good during a time period, in accordance with embodiments of the present invention.

In some embodiments, the present invention may be a system, a method, and/or the computing device 145 (of FIG. 1 and FIG. 2) or the computing device 400 (of FIG. 4). For example, the system and/or the computing device 400 may be utilized to implement a method for determining a price of the good 105 during the first or second time period.

A basic configuration 402 of a computing device 400 is illustrated in FIG. 4 by those components within the inner dashed line. In the basic configuration 402 of the computing device 400, the computing device 400 includes a processor 404 and a system memory 406. In some examples, the computing device 400 may include one or more processors and the system memory 406. A memory bus 408 is used for communicating between the one or more processors 404 and the system memory 406.

Depending on the desired configuration, the processor 404 may be of any type, including, but not limited to, a microprocessor (μP), a microcontroller (μC), and a digital signal processor (DSP), or any combination thereof. Further, the processor 404 may include one more levels of caching, such as a level cache memory 412, a processor core 414, and registers 416, among other examples. The processor core 414 may include an arithmetic logic unit (ALU), a floating point unit (FPU), and/or a digital signal processing core (DSP Core), or any combination thereof. A memory controller 418 may be used with the processor 404, or, in some implementations, the memory controller 418 may be an internal part of the memory controller 404.

The system memory 406 may be of any type, including, but not limited to, volatile memory (such as RAM), and/or non-volatile memory (such as ROM, flash memory, etc.), or any combination thereof. The system memory 406 includes an operating system 420, one or more engines, such as the dynamic pricing engine 140, and program data 424. In some embodiments, the dynamic pricing engine 140 may be an application, a software program, a service, or a software platform, as described infra. Moreover, in additional examples, the dynamic pricing engine 140 may comprise the algorithm 165. The computing device 400 may comprise a storage engine 426, which may be configured to store the information 150 and the historical data 175 used or accessed by the dynamic pricing engine 140.

Moreover, the computing device 400 may have additional features or functionality, and additional interfaces to facilitate communications between the basic configuration 402 and any desired devices and interfaces. For example, a bus/interface controller 430 is used to facilitate communications between the basic configuration 402 and data storage devices 432 via a storage interface bus 434. The data storage devices 432 may be one or more removable storage devices 436, one or more non-removable storage devices 438, or a combination thereof. Examples of the one or more removable storage devices 436 and the one or more non-removable storage devices 438 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 440 facilitates communication from various interface devices (e.g., one or more output devices 442, one or more peripheral interfaces 444, and one or more communication devices 466) to the basic configuration 402 via the bus/interface controller 430. Some of the one or more output devices 442 include a graphics processing unit 448 and an audio processing unit 450, which are configured to communicate to various external devices, such as a display or speakers, via one or more A/V ports 452. The one or more peripheral interfaces 444 may include a serial interface controller 454 or a parallel interface controller 456, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 458. Further, the one or more communication devices 466 may include a network controller 460, which is arranged to facilitate communication with one or more other computing devices 462 over a network communication link via one or more communication ports 464. The one or more other computing devices 462 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 406, the one or more removable storage devices 436, and the one or more non-removable storage devices 438 are examples of the computer-readable storage media. The computer-readable storage media is a tangible device that can retain and store instructions (e.g., program code) for use by an instruction execution device (e.g., the computing device 400). Any such, computer storage media is part of the computing device 400.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 404 of a general purpose computer, special purpose computer, or other programmable data processing apparatus (e.g., the computing device 400) to produce a machine, such that the instructions, which execute via the processor 404 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 400), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method for determining a price of a good during a time period. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system for determining a price of a good during a time period, the system comprising:
   a good;
   a readable identification tag affixed to the good;
   a server comprising:
      a first memory; and
      a first processor;
   an identification tag scanner coupled to the server;
   a computing device comprising:
      a dynamic pricing engine;
      a second processor; and
      a second memory, the second memory being configured to store information associated with the good, wherein the information comprises one or more price-calculation factors assigned to the good;
   a scanner coupled to the computing device, the scanner being configured to:
      scan the readable identification tag affixed to the good; and
      query the second memory of the computing device to identify, from the readable identification tag, the good and the information associated with the good;
   the second processor of the computing device being configured to:
      dynamically access, in real-time, an expiration date of the good and the one or more price-calculation factors associated with the good;
      apply an algorithm of the dynamic pricing engine to the identified good to:
         calculate, in real-time, a price of the good based on the expiration date of the good and the one or more price-calculation factors, wherein a first price of the good determined during a first time period is equal or greater than a second price of the good determined during a second time period since the second time period is closer to the expiration date of the good than the first time period;
         store the price of the good in the second memory;
         modify the calculated price of the good during the time period to optimize a target function, wherein the optimization depends on the one or more price-calculation factors; and
         transmit the price of the good to the server; and
   during checkout, the server being configured to:
      access information associated with the readable identification tag stored in the first memory of the server in response to scanning, by the identification tag scanner, the readable identification tag coupled to the good and assigned to the good; and
      determine, by the first processor of the server, an identity of the good associated with the readable identification tag and its current price.

2. The system of claim 1, wherein the readable identification tag is selected from the group consisting of: a Radio-Frequency Identification (RFID) tag, a barcode, and a matrix barcode.

3. The system of claim 1, wherein the one or more price-calculation factors further include at least two of: a quantity of similar goods, a sale strength of a brand of goods, a catalog price listed for the good, a predetermined minimum price allowed for the good, a demographic area in which the good is sold, a day of the week in which the good is sold, an hour of the day in which the good is sold, a demand curve for the good, whether the good is discounted, whether the good is packaged, whether the good has any competitors, the last price that was charged for the good, whether there is an active advertising campaign for the good, and a price history of the good.

4. The system of claim 1, wherein the scanner is further configured to:
transmit the price of the good to a customer.

5. The system of claim 4, wherein the scanner is further configured to:
transmit the price of the good to a display for display to the customer.

6. The system of claim 1,
wherein the time period is the first time period, and
wherein the calculated price of the good is the first price of the good.

7. A method executed by a system for determining a price of a good during a time period, the system comprising:
a good;
a readable identification tag affixed to the good;
a server comprising:
a first memory; and a first processor;
an identification tag scanner coupled to the server;
a computing device comprising:
a dynamic pricing engine;
a second processor; and
a second memory, wherein the second memory is configured to store information associated with the good, and wherein the information comprises one or more price-calculation factors assigned to the good;
a scanner coupled to the computing device; and
a display, the method comprising:
scanning, via the scanner, the readable identification tag affixed to the good;
querying the second memory of the computing device to identify, from the readable identification tag, the good and information associated with the good;
dynamically accessing in real-time by the second processor of the computing device, an expiration date of the good and the one or more price-calculation factors associated with the good;
applying an algorithm of the dynamic pricing engine to the identified good to:
calculate, in real-time, a price of the good based on the expiration date of the good and the one or more price-calculation factors, wherein a first price of the good determined during a first time period is equal or greater than a second price of the good determined during a second time period since the second time period is closer to the expiration date of the good than the first time period;
store the price of the good in the second memory;
modify the calculated price of the good to optimize a target function, wherein the optimization depends on the one or more price-calculation factors; and
transmit the optimized price of the good to the server; and
during checkout:
accessing, by the server, information associated with the readable identification tag stored in the first memory of the server in response to scanning, by the identification tag scanner, the readable identification tag coupled to the good and assigned to the good;
determining, by the first processor of the server, an identity of the good associated with the readable identification tag and its current price; and
displaying the current price of the good via the display to a customer.

8. The method of claim 7, wherein the algorithm is selected from the group consisting of: a reinforcement learning algorithm, a deep learning algorithm, a machine learning algorithm, and a classic optimization algorithm.

9. The method of claim 8, wherein the reinforcement learning algorithm depends on a simulated environment.

10. The method of claim 9, wherein the reinforcement learning algorithm is selected from a group consisting of: a Q-learning algorithm and a genetic algorithm.

11. The method of claim 7, wherein the target function is based on factors selected from the group consisting of: waste associated with the good during the time period, revenue associated with the good during the time period, waste associated with the good and other goods during the time period, revenue associated with the good and other goods during the time period, and marginal profits associated with the good during the time period.

12. The method of claim 7, wherein the display is coupled to the computing device.

13. A computing device comprising:
one or more processors;
one or more memories configured to store information associated with a good; and
one or more computer-readable hardware storage devices, the one or more computer-readable hardware storage devices containing program code executable by the one or more processors via the one or more memories to implement a method for determining a price of the good during a first time period, the method comprising:
receiving, by the one or more memories and from a scanner coupled to the computing device, a prompt for information associated with a readable identification tag affixed to the good;
querying the one or more memories to identify the good and the information associated with the good from the readable identification tag, wherein the information associated with the good comprises one or more price-calculation factors assigned to the good;
dynamically accessing in real-time, by the one or more processors, an expiration date of the good and the one or more price-calculation factors associated with the good;
applying an algorithm to the identified good to:
calculate, in real-time, a first price of the good based on the expiration date of the good and the one or more price-calculation factors, wherein a first price of the good determined during a first time period is equal or greater than a second price of the good determined during a second time period since the second time period is closer to the expiration date of the good than the first time period;
store the price of the good in the one or more memories; and
modify the first price of the good to optimize a target function, wherein the optimization depends on the one or more price-calculation factors;
transmitting the first optimized price of the good to a server;

during checkout:
- accessing, by the server, information associated with the readable identification tag stored in the first memory of the server in response to scanning, by the identification tag scanner, the readable identification tag coupled to the good and assigned to the good;
- determining, by the first processor of the server, an identity of the good associated with the readable identification tag and its current price; and
- displaying the current price of the good via a display to a customer.

14. The computing device of claim 13, wherein the algorithm is further configured to:
- calculate a second price of the good during a second time period; and
- modify the second price of the good to optimize the target function, wherein the optimization depends on one or more price-calculation factors.

15. The computing device of claim 13, wherein the algorithm is selected from the group consisting of: a reinforcement learning algorithm, a deep learning algorithm, a machine learning algorithm, and a classic optimization algorithm.

* * * * *